United States Patent

(12) United States Patent
Geiser

(10) Patent No.: US 6,389,361 B1
(45) Date of Patent: May 14, 2002

(54) METHOD FOR 4D PERMEABILITY ANALYSIS OF GEOLOGIC FLUID RESERVOIRS

(75) Inventor: Peter Anderson Geiser, Boulder, CO (US)

(73) Assignee: STRM, LLC, Boulder, CO (US)

( * ) Notice: Subject to any disclaimer, the term of this patent is extended or adjusted under 35 U.S.C. 154(b) by 0 days.

(21) Appl. No.: 09/418,820

(22) Filed: Oct. 15, 1999

Related U.S. Application Data

(60) Provisional application No. 60/104,482, filed on Oct. 16, 1998.

(51) Int. Cl.⁷ .................................................. G01V 1/50
(52) U.S. Cl. ............................................ 702/15; 702/13
(58) Field of Search ........................... 702/14, 15, 16, 702/12, 13, 11

(56) References Cited

U.S. PATENT DOCUMENTS

| 5,377,104 A | 12/1994 | Sorrells et al. |
| 5,771,170 A | 6/1998 | Withers et al. |

FOREIGN PATENT DOCUMENTS

| CA | 2044877 | 10/1991 |

OTHER PUBLICATIONS

Wills P. B., et al. "Active and Passive Imaging of Hydraulic Fractures" Jul. 1992.
Colleen A. Barton et al. "Fluid flow along potentially active faults in crystalline rock" pp. 683–686, Aug. 1995.
Kes J. Heffer et al. Novel Techniques Show Links between Reservoir Flow Directionality, Earth Strees, Fault Structure and Geometrical Changes in Mature Waterfloods, pp. 91–98 Jun. 2, 1997.
C.B. Raleigh et al. "An Experiment in Earthquake Control at Rangely, Colorado" pp. 1230–1237 Mar. 1976.

Primary Examiner—Donald E. McElheny, Jr.
(74) Attorney, Agent, or Firm—F. A. Sirr; Holland & Hart LLP

(57) ABSTRACT

An invention for the filtering, sorting and analysis of microseismicity induced during production of fluid resources from their reservoirs which allows direct 4 dimensional measurements of all or many of the components of the permeability field as well as other petrophysical rock properties important to reservoir analysis and monitoring. The seismicity associated with the permeability field is identified by its spatial and temporal location in two general conoidal volumes, symmetrically disposed about the injection point in any well being used for this purpose (FIG. 1). The cone axes are parallel to the maximum compressive stress directions of the ambient stress field. Increasing fluid pressure causes seismicity to rapidly migrate outward from the injection points (FIG. 2). The seismicity moves at rates that are order of magnitudes greater than that of D'arcyian flow and covering distances measured in kilometers. The seismicity is generated by fractures hydraulically linked to the injection well and comprises the permeability field associated with that well. Mapping of the permeability field identified by this means can also be used for guiding the placement of subsequent infill, development and injection wells. In addition by permitting the active deformation field to be seen, it allows potential hazards to the field infrastructure to be recognized. By predicting the fluid paths, the invention forms an important adjunct to 4D active seismic analysis which monitors the migration of fluid fronts.

13 Claims, 11 Drawing Sheets

METHOD FOR 4D PERMEABILITY ANALYSIS OF GEOLOGIC FLUID RESERVOIRS

This application claims priority from U.S. Provisional Patent Application No. 60/104,482, filed Oct. 16, 1998, and entitled "Method for 4D permeability analysis of geologic fluid reservoirs."

FIELD OF INVENTION

This invention relates to the measurement of the permeability fields of underground geologic fluid systems and more specifically it uses microseismicity induced by the production process for determining the petrophysical properties of a reservoir in general, its permeability in particular and analyzing its structure.

BACKGROUND

It is generally known that the earth's crust contains underground fluid reservoirs. These reservoirs form an important natural resource for major components of our economic systems, e.g. oil, gas, water, etc. Recovery of these resources is critically dependent on knowing the "plumbing" of these reservoirs, i.e. the paths through which the fluid moves and by means of which it can be extracted. In a fluid reservoir the "plumbing system" includes a network of interconnected cracks which can be described as "hydraulically linked" i.e. changes in fluid pressure can be transmitted through them. The character of the hydraulically linked crack network is known as the "reservoir permeability field". By character is meant the shape and distribution of the network and the ease with which fluid moves through it. Determining this character is the focus of much of the effort of fluid resource recovery and exploitation.

The reason for this interest is that the spatial geometry of the permeability field and the variation in flow through it, are major factors in identifying the best location for production wells and in the case of hydrocarbons, injector wells in addition to production wells. Injector wells are used to inject fluids that are denser than the hydrocarbons and thus act to "sweep" the less dense fluid that remains after the initial production phase.

To date, determination of the permeability field of fluid reservoirs has been largely restricted to the use of "guess and test" methods using reservoir simulators. A "guess and test" method uses largely inferential and sparse information about the permeability field to make a best "guess" as to its full three dimensional character. The "guess" is then tested by using measured data on production and injection from the field in question in the model, to test whether the model reproduces the measured data. The efficacy of the "guess and test" methods is poor. It is generally accepted that one of the principal reasons that recovery of resource from hydrocarbon reservoirs averages only about 30–35% of the total resource in any given reservoir, is the low quality of permeability information. What is needed is a means of seeing or illuminating the permeability field so that it can be directly measured.

It has been recognized that production from fluid reservoirs can induce seismicity. Attempts have been made to use microseismicity induced by production to identify fracture systems and other possible causes of the earthquakes, e.g. pore collapse, fault reactivation, etc. Efforts at deciphering the information contained in the microseismicity has had limited success. It is believed that the principal reason for this failure has to do with the way earthquake seismologists get their information on the earthquake process (seismogenesis).

An earthquake is a seismic wave that results from the elastic failure of rock. It is the signal or "sound" of that failure. However, elastic failure can result from a variety of natural processes, e.g. folding, faulting under compression/extension, pore collapse, increased fluid pressure, etc. Unfortunately all seismic waves produced by natural causes, no matter what their seismogenesis, are very similar in their appearance or "wave form". This condition makes it virtually impossible to derive the particular process (i.e. folding, faulting, etc.) that produces any given seismic wave by studying the wave itself. Thus the almost exclusive restriction of the analysis of microseismicity to its signal has produced only a limited amount of useful information particularly as far as reservoir characteristics are concerned.

Attempts to distinguish the sets of signals from one another are largely ad hoc. Thus identification of fractures associated with the permeability field is; 1) only inferential; 2) limited to the immediate vicinity of injection wells (i.e. within a few 100 meters). This information is too poor to be usefully extrapolated to the entire reservoir. No attempts to directly measure any other components of the reservoir permeability field using microseismicity have been made. In terms of structural data, i.e. folding and faulting, microseismicity has been used to successfully locate faults in some cases where apparently only simple faulting is occurring. However regions with more complex deformation result in earthquake data clouds which are either left un-interpreted or only poorly explained.

A recent development that permits the clouds of earthquake data to be much more rigorously interpreted is described by Seeber and Armbruster (1995 The San Andreas Fault system through the Transverse Ranges as illuminated by earthquakes, J. Geophysical Research, 100, 5, 8285–8310). They have developed analysis techniques for earthquake slip planes that allow them to be sorted into structural assemblages. These structural assemblages represent portions of the instantaneous and incremental deformation field. The techniques for analyzing the slip plane data are embodied in a known software application; Seeber and Armbruster's QuakeView.

In addition to the foregoing, the following sets of observations on secondary hydrocarbon recovery, hydraulically conductive fractures and microseismicity, are of particular importance with regard to the background of the present invention.

1. Rate Correlation Statistics, Maximum Compressive Directions and Rapid Response Heffer et al, (1997, Novel techniques show links between reservoir flow directionality, earth stress, fault structure and geomechanical changes in mature waterfloods, SPE Journal, V. 2, June, pp. 91–98) show that rate of production correlation's between producer and injection wells is directly related to the orientation of the maximum ambient compressive stress direction. Positive correlation's (i.e. production increases) are observed between injection and production wells where the line connecting the two wells lies within a sector of arc of from 60 to 90 degrees that is bisected by the local maximum compressive stress. Response times between injector and producer wells has "zero" (less than 1 month) time lag over very large distances (>4.5 kilometers). They note that D'arcyian type diffusive flow cannot explain this phenomena.

2. Hydraulically Conductive Fractures are Critically Stressed

Barton et al (1995, Fluid flow along potentially active faults in crystalline rock, Geology, V. 23, no. 8, p. 683–686) demonstrate that critically stressed faults and fractures are those with the highest hydraulic conductivity and that statistically these are conoidally distributed around the maximum stress direction (Barton et al, 1995; FIG. 3).

3. Seismicity Induced By Increased Fluid Pressure Shows Rapid Response Over Large Distances In the earthquake control experiment run at Chevron's Rangely, Colo. field and reported by Raleigh et al (1976, An experiment in earthquake control at Rangely, Colo.; Science, V. 191, p. 1230–1237), microseismicity induced by fluid injection and occurring at distances of up to 3 km from the injection well, were observed to stop within 1 day of lowering fluid pressure at the injection wells.

OBJECTS AND ADVANTAGES

Accordingly, several objects and advantages of my invention are to provide a method of using microseismicity to determine the nature of the interconnected network of openings that define the permeability field of underground reservoirs. By nature is meant the shape of this network, the variation of it's shape in space and time, the change in space and time of the rate of movement of the fluid through the network, etc. The invention does this by providing a means of distinguishing microseismicity associated with the permeability field from other types of microseismicity. It also permits determination of the relationship of the microseismicity to other elements of the reservoir geology, e.g. rock type, whether part of a fold or fault, etc. This information can be used as input to reservoir models and other multidimensional images for exploration, production and development thereby improving the potential of recovery of fluid resources from the earth's crust.

Other objects are;

1. to provide a means of guiding the placement of subsequent wells for the purposes of infill and/or development and/or injection;
2. to provide a means of determining the orientation of the maximum compressive stress direction using fluid injection;
3. to provide a means of using the information derived from the microseismically produced signal to be used for multidimensional analysis of petrophysical properties including direct 4D measurement of components of the permeability field and structural environments;
4. to improve velocity field models;
5. to improve interpretation of geodetic surveys whose aim is identifying subsurface behavior of the crust associated with fluid motion;
6. to provide independent evidence for paths of fluid motion that may be identified by 4D seismic reflection analysis or other means;
7. to provide information on possible hazards to human infrastructure arising from deformation of the earth's crust associated with fluid extraction and injection.

Still further objects and advantages will become apparent from a consideration of the ensuing description and accompanying drawings.

PREFERRED EMBODIMENT—DESCRIPTION

Microseismicity is the product of a large number of independent parameters. Analysis of multiparametric phenomena requires the ability to control and directly compare the various parameters. It is a basic aspect of this invention to control and compare as many of these parameters as possible. The description of this invention describes the controlling mechanism and the means of systematic collection and assemblage of all parametric data available into a single n-dimensional model. This model allows direct comparison of one parameter against another in correct spatial and temporal relations and also provides a means for direct measurement and mapping of the entire reservoir permeability field as well as all other seismogenic aspects of the reservoir. This system of data collection, assemblage, analysis and displaying the results as multi-dimensional images, is referred to as Seismo-Tectonic Reservoir Monitoring™ or STRM™.

Figure 1:
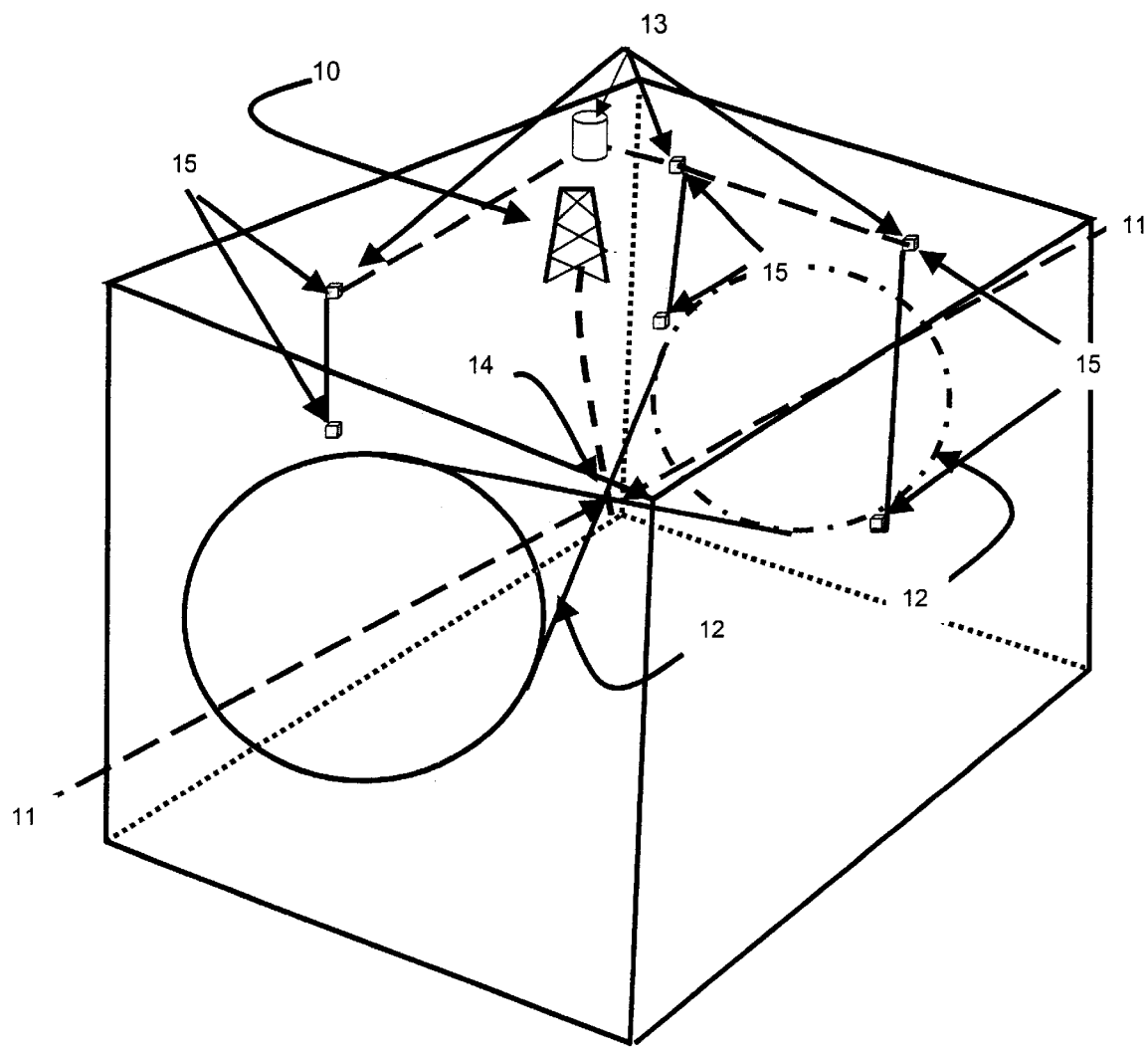
FIG. 1 is a perspective view of a conoidal volume of failure containing the microseismicity associated with the hydraulically linked fracture system. The microseismicity is generated by the interaction between increased fluid pressure at the injection well and the ambient stress field.

FIG. 1 is a three dimensional schematic showing how an operating injection well can be used to control the seismicity of a hydraulically linked network. The figure shows the geometric relationships between an operating injection well [10] used to control seismicity, the maximum compressive stress direction of an isotropic, homogeneous ambient stress field [11], the two conoidal volumes locating the hydraulically linked microseismicity [12] and a hypothetical passive seismic network [13] that may be connected to a central computer [43]. The conoidal volumes are symmetrically distributed with respect to the injection point of the well [14]. The maximum compressive stress direction locates the cone axes [11]. The apical angle of the cones will always be acute, typically varying from 20 to 45 degrees but may be larger or smaller depending on local conditions. The cone apices are located at or close to the point on the well bore where fluid is being injected [14]. The cone axes have lengths measured in kilometers. The seismometers [15] in the passive seismic network [13] may be located either on the surface and/or in the subsurface. Optionally, instead of connecting the seismometers [15] to a central computer [43], the seismometers could include processors therein for processing and analyzing the data. The connections between the components of the network could be via electrical conductors, optical links, transmitted electromagnetic waves, or any other suitable medium.

Figure 2:
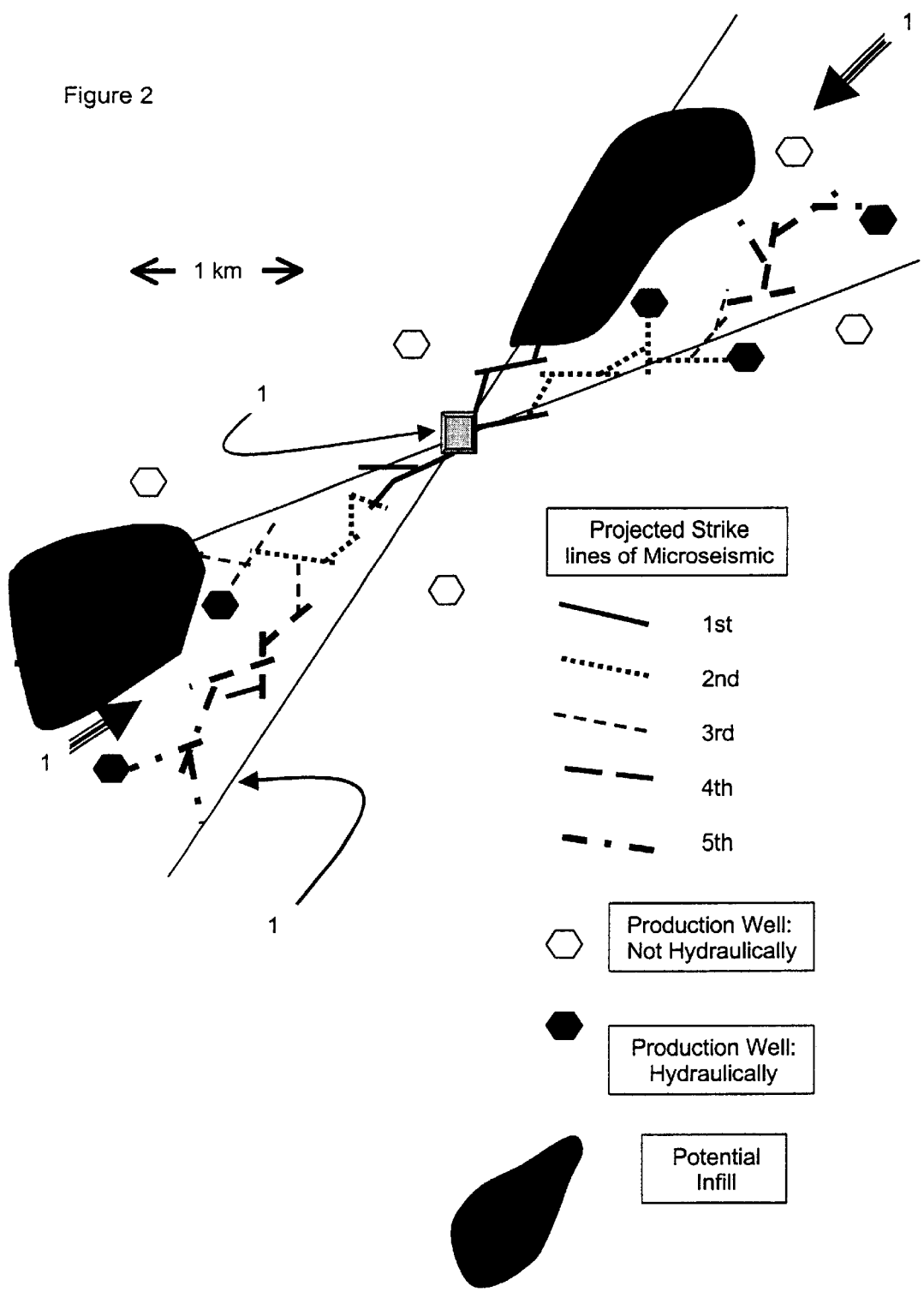
FIG. 2 is an elevation view of FIG. 1. The view is parallel to the axes of maximum compressive stress and shows the conoidal volumes in cross section as the two lines that intersect at the point of fluid injection on the well.

FIG. 2 is an elevation view made parallel to the maximum compressive stress directions [11]. The intersections of the conoidal volumes with the plane of the elevation are shown by the two lines [12] that intersect at the well injection point [14].

Figure 3:
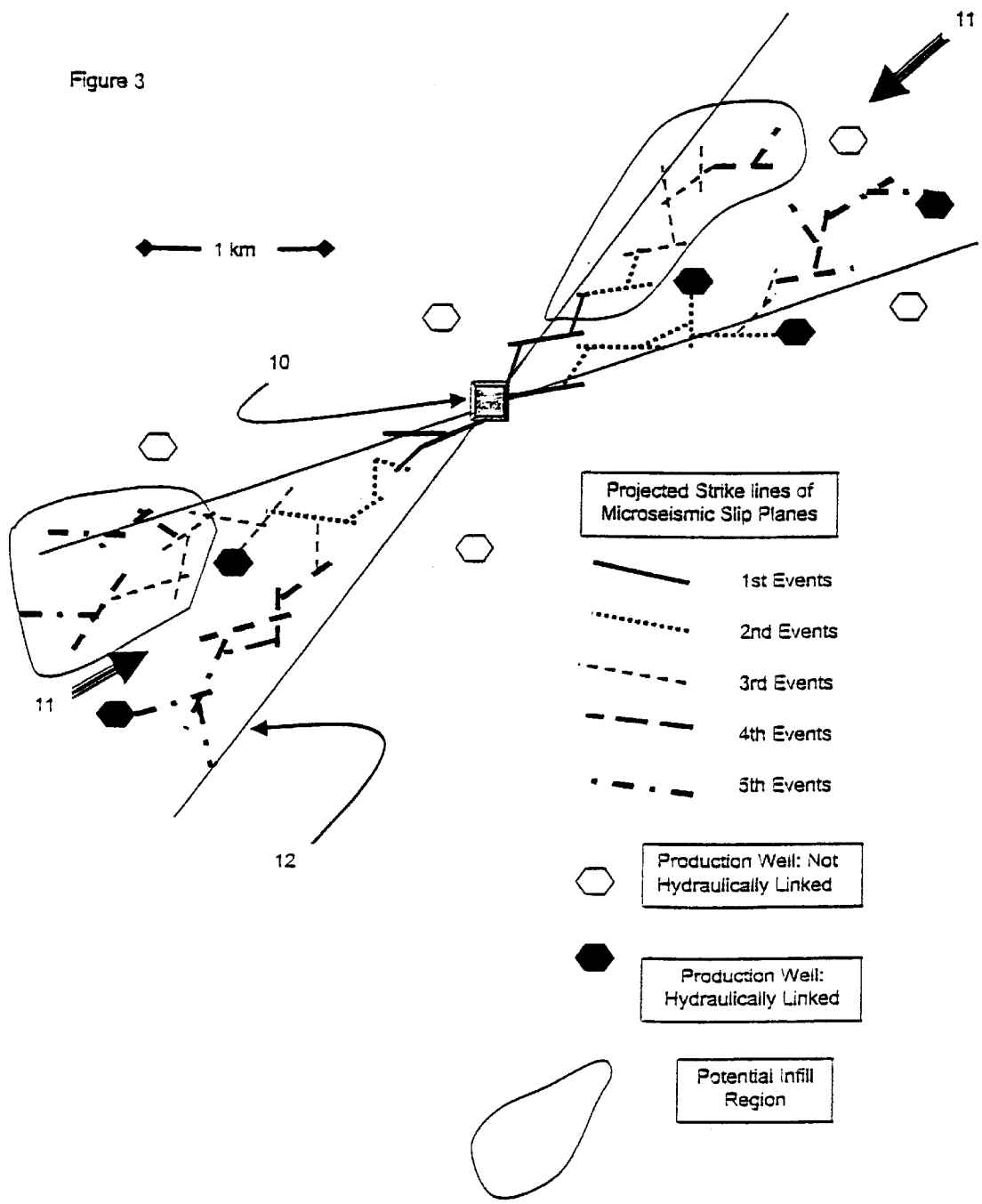
FIG. 3 is a schematic time/map view of a hypothetical example showing the behavior of hydraulically linked microseismic events generated by increased pore pressure at the injection well. The microseismic events are shown by the projection onto the map of the line of intersection between the slip plane of the microseismic event and a horizontal plane.

FIG. 3 shows how microseismicity illuminating a hydraulically linked fracture network can be identified. The stress field is isotropic and homogeneous. The figure is a schematic map view showing a hypothetical example of the space/time variation of microseismic events hydraulically linked to an injection well [10]. The events are produced by an increase in fluid pressure at that well [10]. The hydraulically linked events can be recognized by two characteristics, one spatial and the second temporal:

1. Spatially the events occur within the region bounded by a projection of the conoidal volumes [12] of which the maximum compressive stress is the cone axis. The map view projection of the maximum compressive stress direction [11] of the ambient stress field forms the bisector of the angle between the projected boundaries of the conoidal volumes [12] containing the hydraulically linked events.
2. Temporally, the projections of the strike lines of these events migrate away from the injection well in time. The events are grouped into arbitrary time units for purposes of illustration only.

Regions of hydraulically linked microseismicity that contain no production wells identify areas of potential well infill. The axis of the conoidal pattern of seismicity created by the injection well also locates the direction of the maximum compressive stress axis and can be used to independently determine the ambient stress field.

For the case of an anisotropic, heterogeneous stress field, the path of the permeability field microseismicity is determined by the local variation in the maximum stress direction. The variability of this field can be independently derived from standard independent means which refers to resolved earthquake focal mechanisms, borehole breakouts, and so forth, and also by the conoidal pattern of seismicity induced by injection wells.

Figure 4:
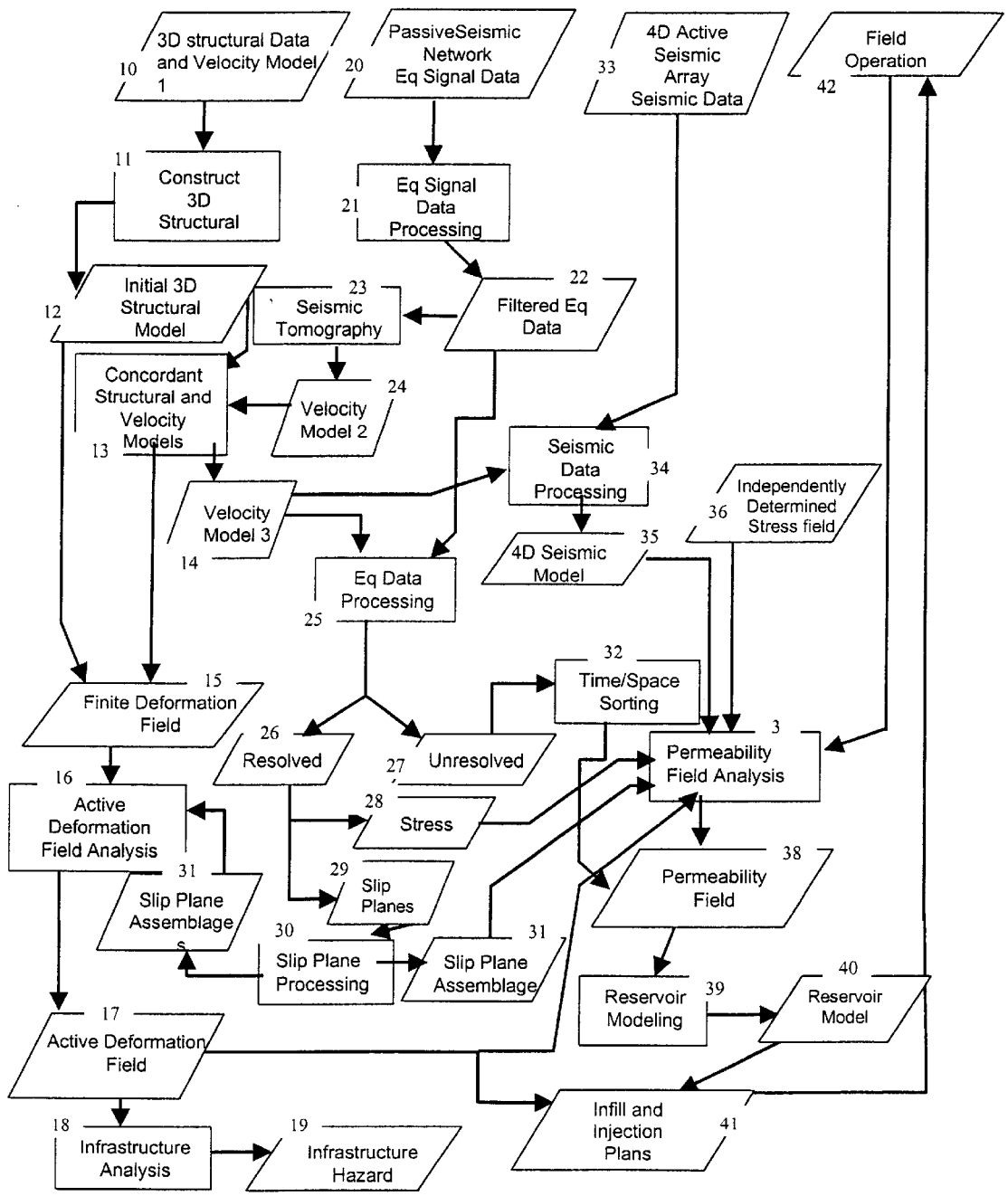
FIG. 4 is a flowchart of a Seismo-tectonic Reservoir Monitoring system. The flowchart shows how all available geological and geophysical parameters associated with seismogenesis and reservoir characterization are collected, processed and assembled.

FIG. 4 is a flowchart of a seismo-tectonic reservoir monitoring system (STRM). The purpose of this system is the gathering, processing and analysis of all geological and geophysical data on the reservoir that is available and relevant to the process of seismogenesis and fluid production and displaying it as a multi-dimensional image. Once prepared, this information may be applied to determining the permeability field; identifying potential field infrastructure hazards and improving reservoir modeling. A key element is that the system allows different geophysical and geological parameters relating to seismogenesis, reservoir geology and geophysics, to be directly compared to one another. The microseismicity data provides important quantitative information critical to the fluid production process that is only indirectly available by other means and thus makes a significant improvement in the reservoir monitoring process. Although three velocity models are indicated this is simply the minimum number needed to achieve optimal results. The actual number of models used may be larger or smaller. The following describes the components of the flowchart:

3D Structural Data and Velocity Model [10]

3D structural data and 3D velocity model(s) are gathered. 3D structural data includes of geometric and kinematic information (e.g. strike and dip of bedding, faults, etc.; stratigraphic boundary locations; movement indicators; etc.). 3D velocity models give the distribution of seismic velocities in the volume of interest. The models are provided by known independent methods embodied by existing software applications (e.g. Velmod, etc.).

Construct 3D Structural Model Box [11]

The structural data gathered in the previous step is processed into a 3D structural model using section construction and validation techniques. These techniques permit physically impossible interpretations to be eliminated from consideration. The section construction and validation techniques are provided by known independent methods embodied by existing software applications (e.g. Paradigm Geophysical's Geosec programs, etc.). The structural model provides the geometry of the finite deformation field. The finite deformation field includes the directions of lines of no finite longitudinal strain, the simple shear directions, the surfaces containing the displacement vectors.

Initial 3D Structural Model [12]

The initial 3D structural model is a validated interpretation of the section construction process. It may be brought into concordance with the velocity model or used directly as the 3D finite deformation field.

Concordant Structural and Velocily Models [13]

The structural and velocity models are processed by comparing and adjusting them to resolve differences. An example of such differences might be where the structural model shows faulting of units with known velocity contrasts where such contrasts are not reflected in the velocity model. Resolving the problem requires that the input parameters and their method of analysis for the two different models be examined to see if there is sufficient flexibility to bring the two into concordance. This process results in the creation of a concordant velocity model (Model 3).

Velocity Model 3 [14]

The concordant velocity model (Velocity Model 3) is the output of the Concordant structural and velocity model processing. It is used for processing earthquake and seismic reflection data.

Finite Deformation Field [15]

This is either the validated or the adjusted 3D structural model that conforms to the concordant velocity model. The 3D structural model gives the finite deformation field.

Active Deformation Field Analysis [16]

The active deformation field shows the structures that are presently deforming. It is created by the addition of earthquake slip plane assemblages to the finite deformation field model. Geiser and Seeber (1997 Seismo-Tectonic Imaging: A New Time Lapse Reservoir Monitoring Technique. Applications of Emerging Technologies: Unconventional Methods in Exploration for Petroleum and Natural Gas V. Proceedings, Dallas, Tex.; Oct. 30–31, 1997, ISEM, Southern Methodist University, Dallas, Tex., p. 137–152.) have developed a technique, seismo-tectonic imaging and analysis, for imaging the finite deformation field and relating it to the instantaneous and incremental deformation represented by seismogenic activity. The tools for applying this technique are embodied in known software applications (e.g.

Paradigm Geophysical's Geosec programs, Midland Valley's Move programs).

These analysis tools use a quantitative description of the geometry and kinematics of the rock deformation mechanism to process structural data and image the finite deformation field. This field includes of lines of no finite longitudinal strain, the simple shear directions and the displacement surfaces containing the displacement vectors.

Making the assumption of volume constant strain permits the infinitesimal and instantaneous strain field to be located. Given the location of this field it is now possible to place the earthquake slip planes into their proper geological and structural environments. Thus the clouds of earthquake data that were either un-interpretable or only weakly so, can now be much more confidently understood.

Active Deformation Field [17]

The active deformation field is the product of the deformation field analysis. It is displayed as a multidimensional image.

Infrastructure Analysis [18]

An analysis of physical infrastructure is made in the context of the active deformation field to determine which active structures represent potential hazards to the infrastructure. Combining the active deformation field with the infrastructure in a multidimensional image does this. Thus infrastructure located in close proximity or in the path of tectonically active structures may be considered at risk.

Infrastructure Hazard [19]

The output of the infrastructure hazard shows the infrastructure that is at risk from the active deformation field.

Passive Seismic Network; Eq (Earthquake) Signal Data [20]

Microseismicity data collected by the Passive Seismic Network. The passive seismic network is the collection of recording devices for detecting and collecting seismic waves generated by earthquake activity.

Eq Signal Data Processing [21]

The raw seismic wave data is treated using filtering algorithms, transform analysis and other such analysis tools, to remove noise and analyze the seismic waveforms. These tools are embodied in known software applications; e.g. Engineering Seismology Group's Hyperion system.

Filtered Eq Data [22]

The filtered earthquake data is the output of the Eq signal data processing.

Seismic Tomography [23]

The processed earthquake data is treated using tomographic techniques to create a velocity model (Velocity Model 2 [24]). The tomographic tools for creating the velocity models from earthquake data are embodied in known software applications that are widely disseminated in the seismological literature.

Eq Data Processing [25]

Processing of earthquake data uses the concordant velocity model to give resolved [26] and/or unresolved [27] earthquake hypocenter information. The resolved hypocenters provide information on the local variation in the stress field [28] via focal mechanism analysis as well as the location and orientation of earthquake slip planes [29] and the slip direction on those planes. The slip planes are subjected to Slip Plane Processing [30]. Techniques for focal mechanism analysis are widely disseminated throughout the seismological literature.

Resolved [26]

These are resolved hypocenters output from Eq data processing [24]. They provide information on the local stress conditions [28] and earthquake slip plane orientation [29]. Techniques for resolving hypocenters are widely disseminated throughout the seismological literature.

Unresolved [27]

Unresolved hypocenters give only the spatial and temporal location of the earthquake. These data are subject to Time/Space sorting [32].

Stress [28]

Stress is output as a multidimensional image that contains information on the local stress field derived from focal mechanism analysis output from Eq data processing [25].

Slip Planes [29]

Information on earthquake slip planes output from Eq data processing [25].

Slip Plane Processing [30]

Sorting of slip planes into slip plane assemblages illuminating structural elements. Slip plane-processing uses known software (e.g. Seeber and Armbruster's "Quakeview") that embodies the sorting and filtering of the earthquake data into structural assemblages in space as well as time.

Slip Plane Assemblages [31]

Slip plane assemblages are output from slip plane processing. Slip plane assemblages are structural elements illuminated by earthquakes. They are output as a multidimensional image.

Time/space Sorting [32]

Time/space sorting of the hypocenter data creates assemblages of hypocenters, which are related only by their time/space coordinates, e.g. assemblages with the same time coordinates, same space coordinates, and so forth. Sorting is done by standard sorting routines.

4D Active Seismic Array Seismic data [33]

The 4D active seismic array collects time lapse 3D seismic data in order to detect time/space variation in velocities. This information is used to infer the movement of fluids in the reservoir.

Seismic Data Processing [34]

The concordant velocity model [14] is used to process seismic reflection data collected by 4D Active Seismic Network.

4D Seismic Model [35]

4D seismic model is the result of processing the time-lapse 3D seismic reflection data using the concordant velocity model [14]. The 4D seismic model shows the movement of fluid phases with time.

Independent Stress Field Determination [36]

The determination of the stress field by means other than the STRM process, these means include focal mechanism analysis, borehole breakout, and so forth.

Permeability Field Analysis [37]

Permeability field analysis comprises the processing of geological and geophysical data relevant to the permeability field. The processing of this data uses known software (e.g. Colorado School of Mines Unsert application) as well as the analysis tools of the STRM system.

Permeability Field [38]

The permeability field is a multidimensional image that is the output of the permeability field analysis.

Reservoir Modeling [39]

Reservoir modeling processes the geological and geophysical data input to derive a reservoir model [40]. It uses known software, which embodies reservoir simulators (e.g. DOE's Boast, Landmark Graphic's, STORM, and so forth.) but in addition includes the finite and active deformation fields, permeability and stress fields from the STRM process and information on fluid motion from 4D seismic model. The output is the reservoir model [40].

Reservoir Model [40]

The reservoir model is a multidimensional image consisting of all the geological, geophysical and petrophysical data deemed relevant to the reservoir properties.

Infill and Injection Plan [41]

The infill and injection plan is derived from the Reservoir modeling and the model so created. It is the plan for locating new reservoir infill and injection wells as well as formulating ideas on how to improve existing wells.

Field Operation Data [42]

Field operation data includes of production, fluid pressure and other information from production field operations. It is used to monitor performance of the STRM system and as input for reservoir modeling [39] and Permeability field analysis.

Reservoir Modeling [38]

Reservoir modeling processes the geological and geophysical data input to derive a reservoir model [39]. It uses known software which embody reservoir simulators (e.g. DOE's Boast, Landmark Graphic's, STORM, and so forth.) but in addition includes the finite and active deformation fields, permeability and stress fields from the STRM process and information on fluid motion from 4D seismic model. The output is the reservoir model [39].

Reservoir Model [39]

The reservoir model is a multidimensional image consisting of all the geological, geophysical and petrophysical data deemed relevant to the reservoir properties.

Infill and Injection Plan [40]

The infill and injection plan is derived from the Reservoir modeling and the model so created. It is the plan for locating new reservoir infill and injection wells as well as formulating ideas on how to improve existing wells.

Field Operation Data [41]

Field operation data includes of production, fluid pressure and other information from production field operations. It is used to monitor performance of the STRM system and as input for reservoir modeling [38] and Permeability field analysis [36].

Figure 5:
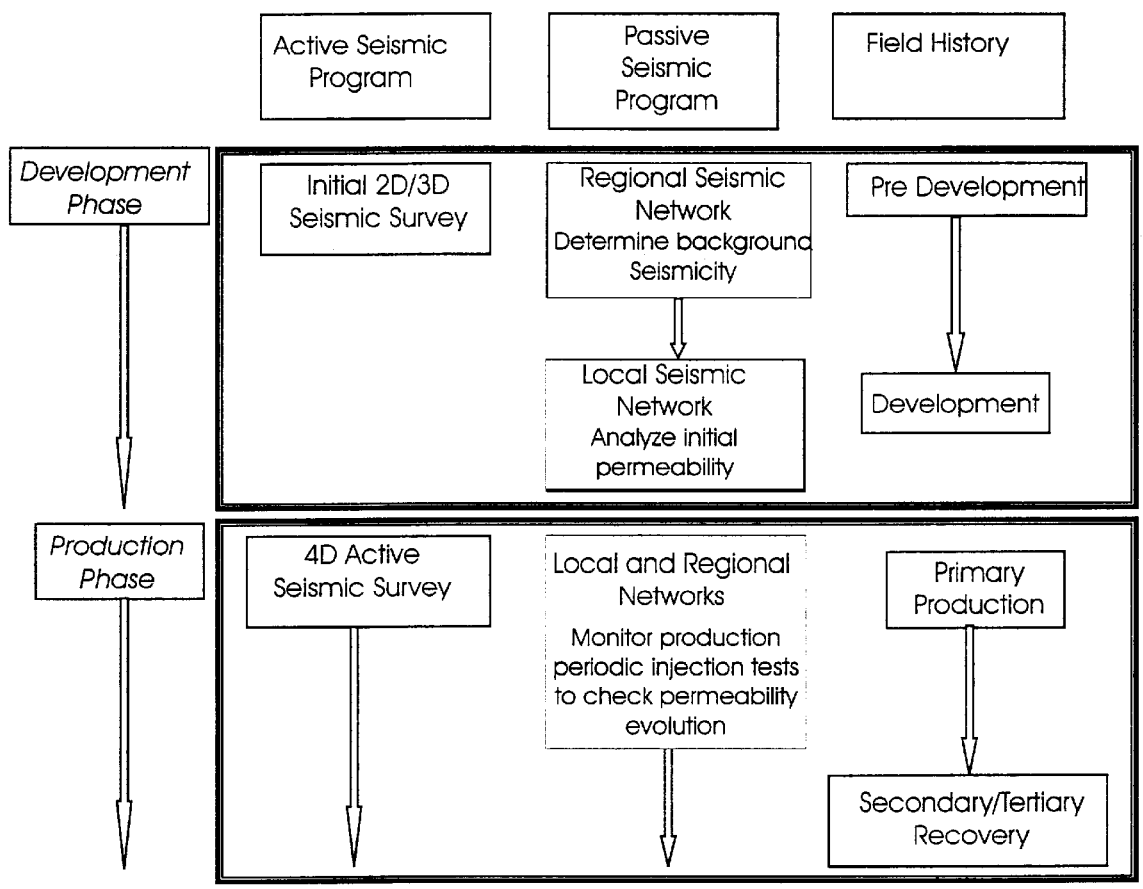
FIG. 5 is a flowchart showing development phases of a passive seismic monitoring program relative to field development stage and a 4D seismic program.

FIG. 5 is a diagram of the role that STRM has in the production and development history of the field.

Development Phase

During pre-development, a regional passive seismic network is set up to determine the level of background seismicity and the active deformation field prior to drilling and production operations. Earthquake tomography also provides an independent velocity model used to establish the concordant velocity model (FIG. 4). The local seismic network that monitors the field is established during development. In addition initial fluid injection tests are run on production wells to map the initial permeability field associated with each well (FIG. 6a–f, the orientation of the maximum compressive stress axis and as a guide for locating wells during field delineation (FIG. 6a–f).

Production Phase

During primary production the local and regional passive seismic networks monitor activity. Periodic injection tests track the evolution of the permeability field while ongoing analysis of the active deformation field provides information on the interaction between the regional stress field and changes in the stress state and tectonics of the field induced by production activities. Further information critical to understanding and predicting the geomechanics and fluid migration history are also provided as shown in FIG. 4.

During secondary and tertiary recovery, the local and regional passive seismic networks monitor activity. Periodic injection tests track the evolution of the permeability field while ongoing analysis of the active deformation field provides information on the interaction between the regional stress field and changes in the stress state and tectonics of the field induced by production activities. Further information critical to understanding and predicting the geomechanics and fluid migration history are also provided as shown in FIG. 4.

Figure 6A:
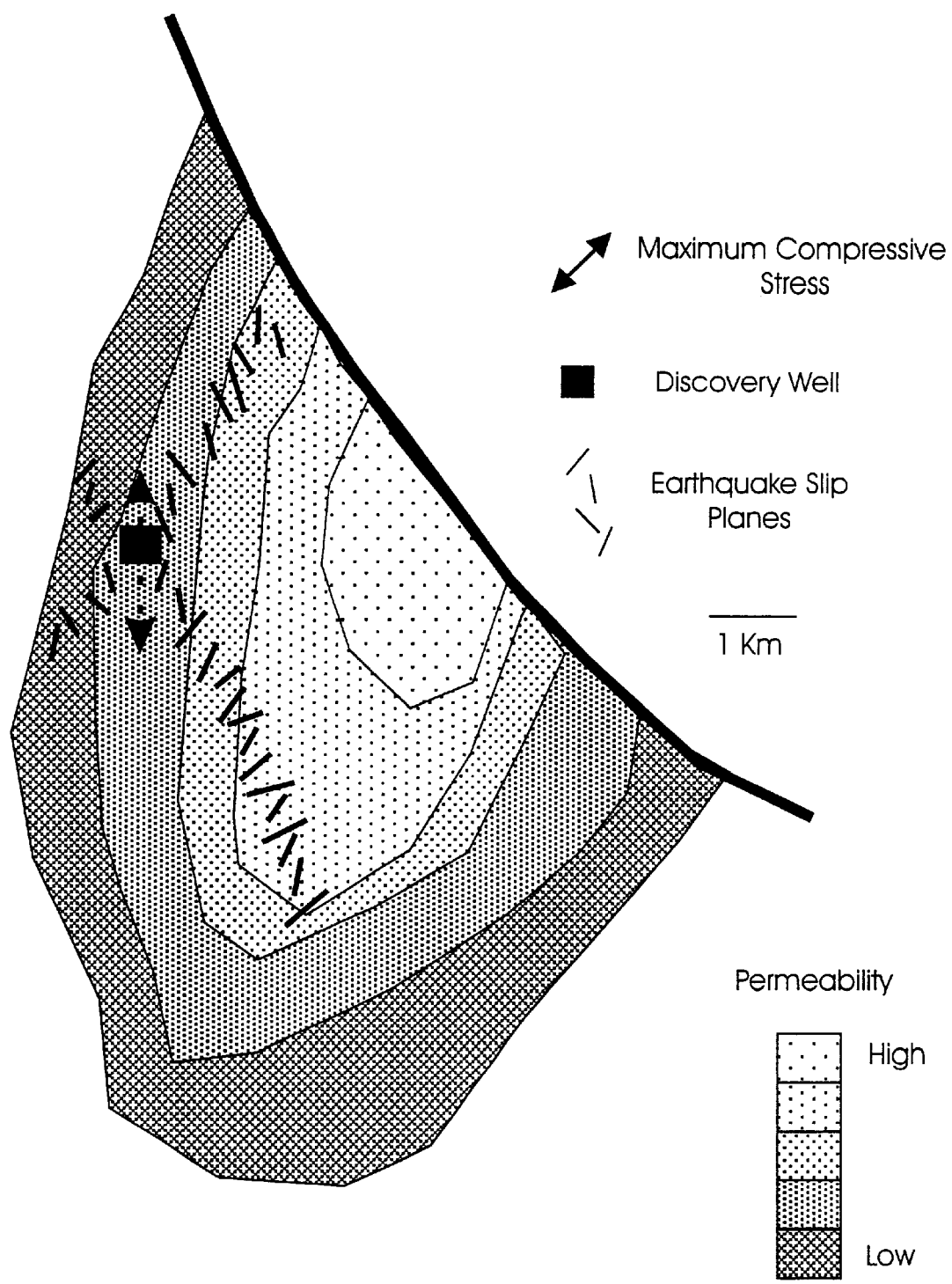
FIG. 6a is a schematic map view of a hypothetical reservoir showing the method by which the STRM system can be used to map the permeability and stress fields as a guide for oil and gas field for development (STRM mapping). It shows the initial injection test results for the discovery well and the location of the first delineation well.

FIG. 6a shows the means by which the STRM system is used to map the permeability and stress fields of a hypothetical reservoir. In this phase an injection test is run in the discovery well [10]. The STRM passive seismic network records the distribution of microseismicity resulting from the test and shown as earthquake slip planes. The slip planes form a conoidal volume indicating the part of the permeability field that is in communication with the discovery well. The extent and density of the microseismicity are a function of the permeability field. Regions of greater extent and denser seismicity may reflect volumes of higher permeability. Regions of lesser extent and more diffuse seismicity may reflect volumes of lower permeability. The seismicity distribution is used as a guide to locate the first delineation well [11]. The cone axis of the conoidal volume of seismicity gives the maximum principal stress direction [12].

Figure 6B:
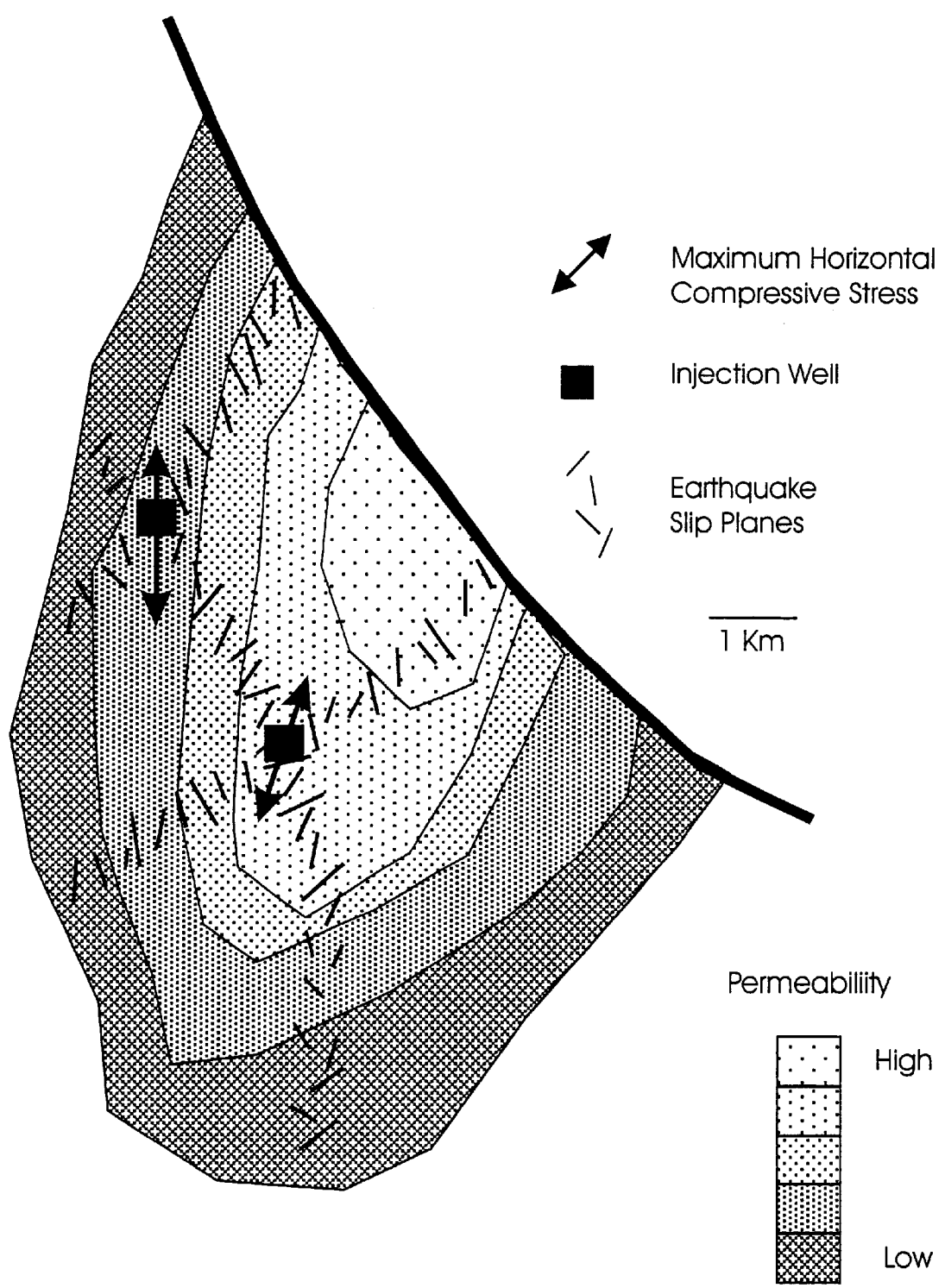
FIG. 6b is a schematic map showing the second injection test run at the first delineation well to further STRM map the hypothetical field and to place the second delineation well.

FIG. 6b shows the placement of the first delineation well [10] within the permeability field in communication with the discovery well [11]. An injection test is now run in the first delineation well [10] creating a new conoidal volume of earthquake slip planes. The cone axis of this volume [12] gives the orientation of the maximum compressive stress direction at the delineation well [10]. The new region of the permeability field located by the injection test in the first delineation well is used to locate the second delineation well [13].

Figure 6C:
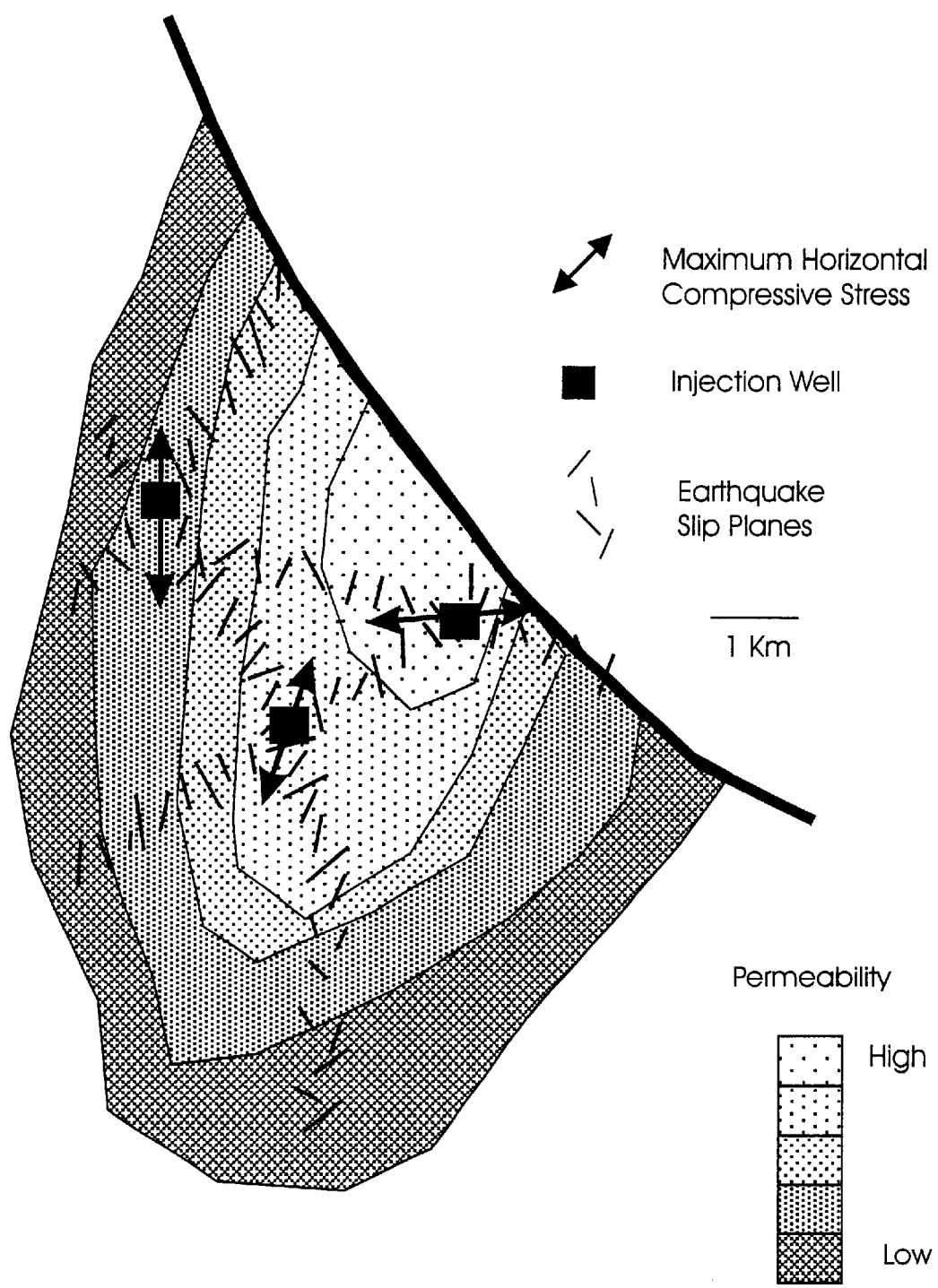
FIG. 6c is a schematic map showing the third injection test run at the second delineation well to further STRM map the hypothetical field and to place the third delineation well.

FIG. 6c shows the pattern of seismicity responding to an injection test in the second delineation well [10]. Note that the short extent of the seismicity extending to the right from the second delineation well [10] indicates the presence of a boundary to the permeability field [11]. The cone axis to the seismicity generated by the injection test gives the local orientation of the maximum compressive stress axis [12]. Because the orientation of the stress field at the second delineation well [10] leaves an area unmapped, it is necessary to place a third delineation well [13] in the permeability field imaged by the discovery well [14] in order to run an injection test in this new well [13] to cover the unmapped area.

Figure 6D:
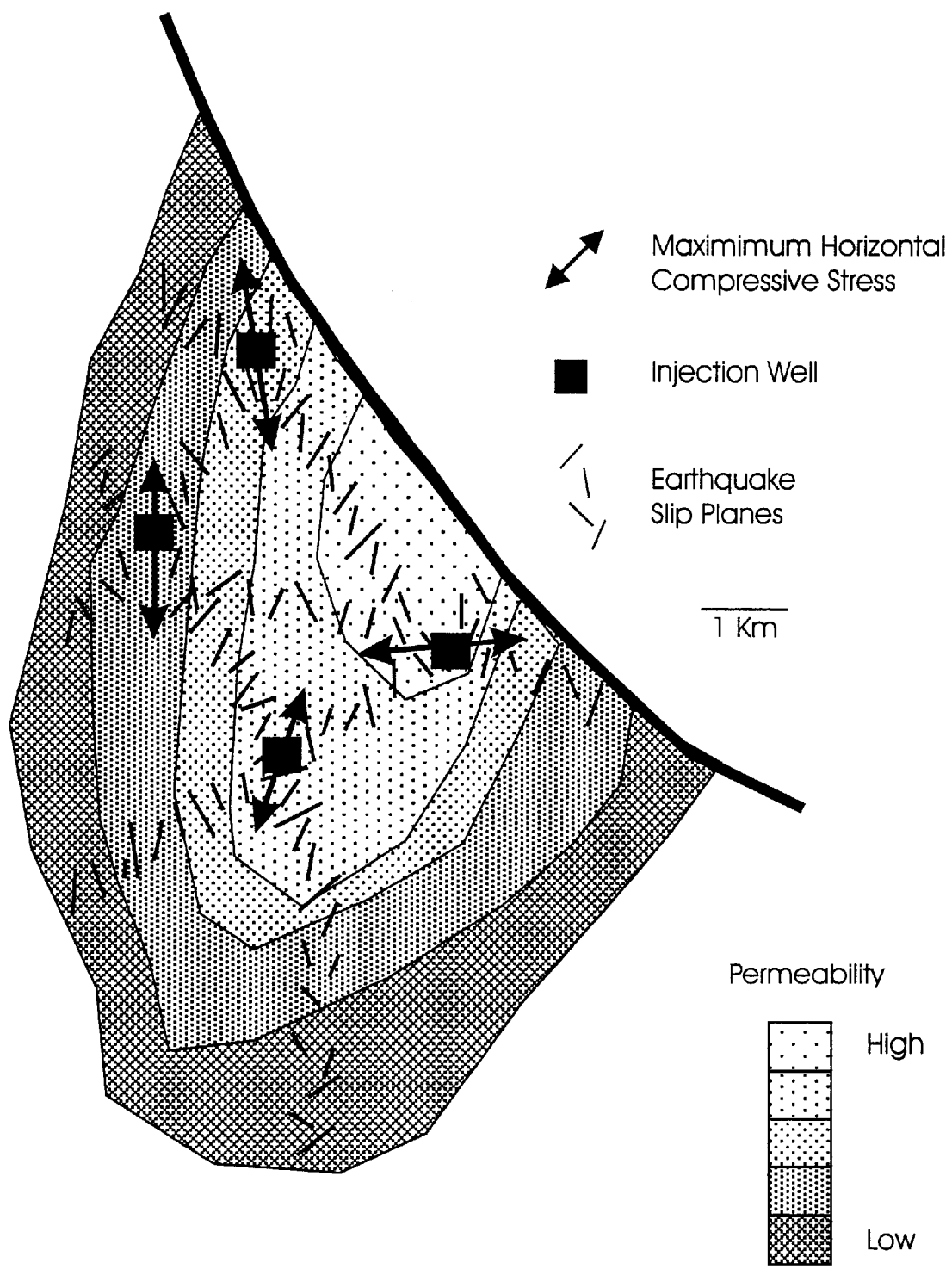
FIG. 6d is a schematic map showing the fourth injection test run at the third delineation well to further STRM map the hypothetical field.

FIG. 6d shows a continuation of the permeability field mapping using the third delineation well [10]. An injection test in this well fills in the information gap between it and the second delineation well [11].

Figure 6E:
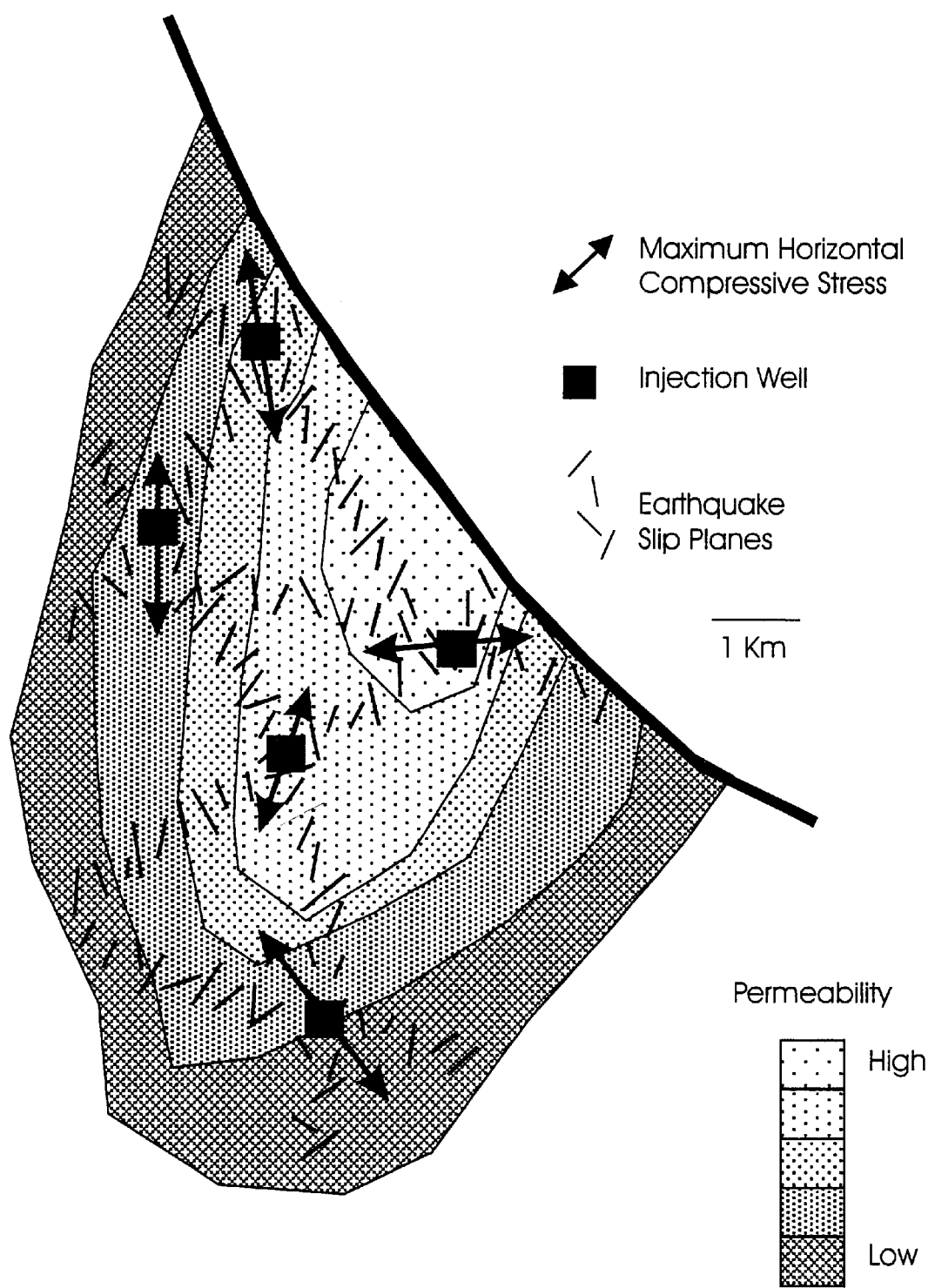
FIG. 6e is a schematic map shows the placement of a fourth delineation well and its use to further STRM map the hypothetical field.

FIG. 6e shows the placement of the fourth delineation well [10] in the permeability field revealed by the first delineation well [11] in order to further map the reservoir permeability of the field.

Figure 6F:
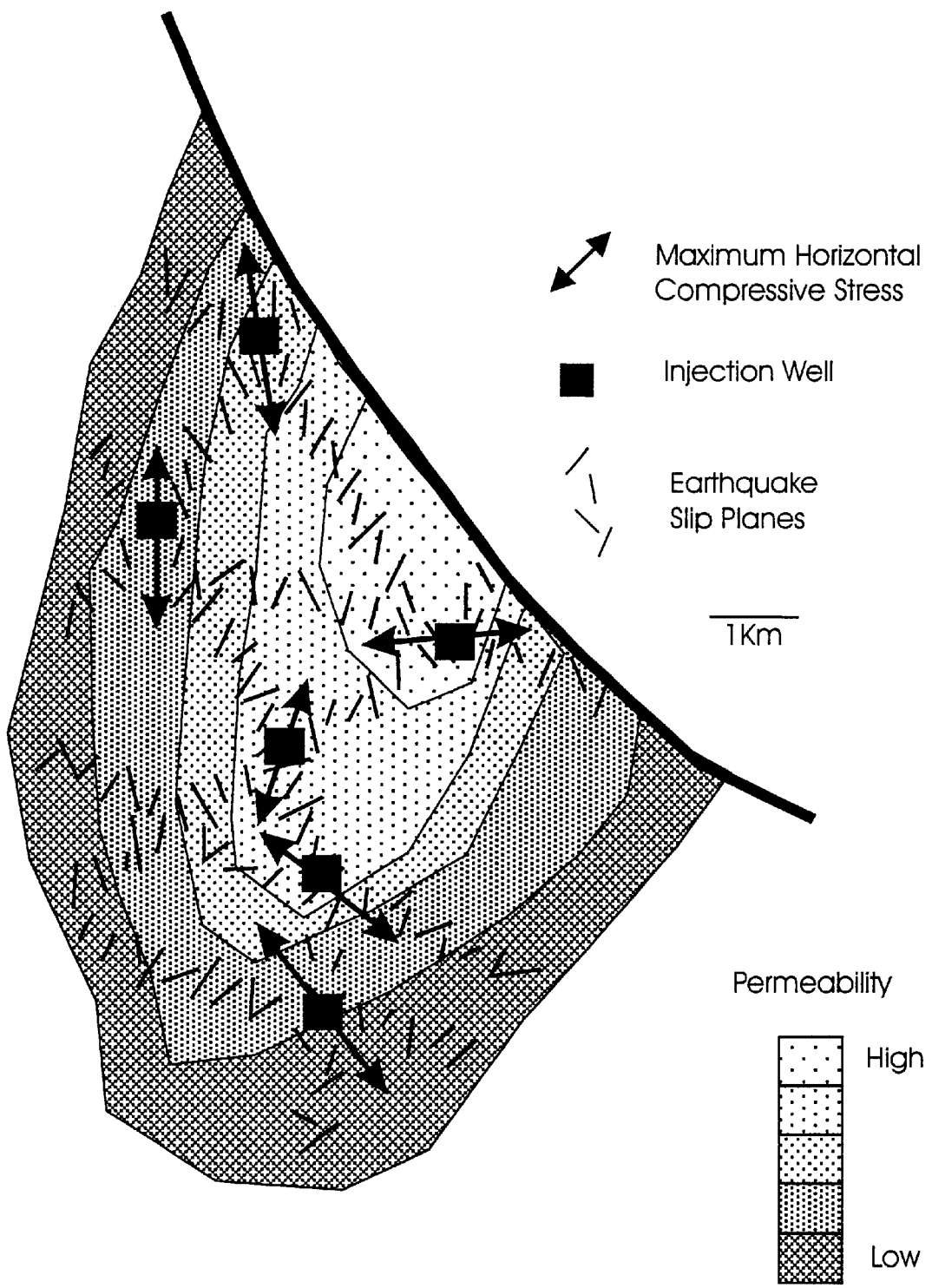
FIG. 6f is a schematic map shows the placement of a fifth delineation well and its use to further STRM map the hypothetical field.

FIG. 6f shows the placement of a fifth delineation well [10] between the fourth delineation well [11] and the first delineation well [12] in order to map the permeability field not imaged by the first and fourth wells.

Preferred Embodiment

Operation

FIG. 1 shows the means whereby microseismicity illuminating the hydraulically linked fractures of the permeability field may be recognized. There exist two conoidal volumes [12] sharing a common cone axis [11] and whose apices join at the point of fluid injection [14] of the injection well. The common cone axis [11] is the maximum compressive stress direction of the local ambient stress field. The conoidal volumes contain the set of fractures that are hydraulically linked to the injection well. As fluid pressure is increased, the hydraulically linked fractures fail elastically resulting in a set of earthquakes whose size depends upon that of the rupture. As long as fluid pressure is maintained at the well, the increased fluid pressure will move out from the well (FIG. 3) creating a migrating front of microseismicity illuminating the reservoir permeability field associated with the active injection well. It is believed that maintaining a static fluid pressure may be most effective in revealing the hydraulically linked fractures, however it may also be that pulsing or fluctuating fluid pressure may be desirable or equally as effective under some or all circumstances.

The unique temporal and spatial association of the seismicity associated with the permeability field allows the permeability field to be identified.

1. Spatially it is located within the conoidal volumes ([12] of FIG. 1) defined by the ambient maximum compressive stress direction ([11] of FIG. 1) and the location of the injection point ([14] of FIG. 1) on the injection well.
2. Temporally the seismicity is recognized by its rapid outward migration from the active injection well (FIG. 3). Seismicity migration rates will exceed that of diffusional flow by 3 to 5 orders of magnitude. The onset of the seismicity is set by the initiation of increased fluid pressure at the injection well ([10] of FIG. 1). FIG. 3 schematically illustrates a hypothetical example of the seismicity motion associated with an injection well.
3. This procedure may be inverted to identify regions of high fluid pressure. Knowledge about the physical characteristics of the reservoir can be had from the following observations:
1. Speed of migration of seismicity provides information on the average permeability while variation in the rate of migration indicates relative changes in the permeability field.
2. The orientation and location of the earthquake slip planes enables direct measurement of the geometry of the part of the permeability field controlled by fractures.
3. The orientation of the earthquake slip planes relative to the maximum compressive stress directions (e.g. as plotted on a 3 dimensional Mohr diagram) provides information on the rock strength.
4. Seismo-tectonic analysis of the earthquake data provides information on structural controls on the permeability.
5. Continuous monitoring of microseismicity associated with field production provides information about the evolution of the reservoir.
6. Identification of the microseismicity associated with the permeability field acts as a filter for distinguishing other earthquake data sets. It does this by distinguishing their cause from those of the remaining earthquake events.

A model for the operation of the present invention is based upon the well established observation that the earth's lithosphere is everywhere close to critical failure and that small perturbations (on the order of 1 bar or less) are sufficient to cause failure. The reasoning behind the present invention is that the observations made by Raleigh et al (1976) and Heffer et al (1997) demonstrate that there exists a means of rapidly communicating increased fluid pressure over large distances by a non-D'arcyian mechanism. The induced microseismicity of the Rangely experiment had the same position relative to the injection wells and the maximum compressive stress (i.e. within 45 degrees) as do the positive correlating production and injection wells observed by Heffer et al (1997). Shutting in the wells at Rangely also caused seismicity to cease at distances of up to 4 kms from the injection wells within 1 day. Barton et al (1995) indicate that the hydraulically conductive fractures have a conoidal spatial distribution about the maximum compressive stress direction (FIG. 1 of this invention). The conoidal distribution is also reflected in the geometric relationship between injection and production wells found by Heffer et al (1997). These fractures make angles with the maximum compressive stress direction ranging from about 10 to 45 degrees. FIG. 4 from Heffer et al (1997) shows the development of "shear bands" in a coupled "geomechanical-fluid flow" model, which "emanate from the injector within 45 degrees of Shmax (the maximum compressive stress) to provide the main paths of conductivity."

Placing these results in the context of the well established observation that the earth's crust is in a metastable yield condition where stress drops on the order of a few bars or less are associated with microseismicity, indicating that only very small changes in stress state are necessary for failure, leads me to hypothesize the following set of events:

1. It is known that fluid pressure increases are rapidly propagated throughout a system whose components are in fluid communication. I term such a system "hydraulically linked". The permeability field of a fluid reservoir is an example of a hydraulically linked system.
2. Fluid pressure increase created at the injection point of an injection well interacting with the maximum compressive stress direction of the ambient stress field creates two conoidal volumes of maximum shear stress ([12] FIG. 1), approximately symmetric about the maximum compressive stress direction ([11] FIG. 1). Fracture planes occupying this volume whose shear strength and orientation are such that they are critically loaded for failure and hydraulically linked to the injection well, will respond to the increase in fluid pressure by elastic failure. These failures will be reflected as small earthquakes illuminating the reservoir permeability field.
3. Thus an increase in fluid pressure at an injection well will cause a wave of microseismicity to move out from the well in a volume whose geometry is defined by the ambient stress field. This microseismicity will illuminate the permeability field of the reservoir associated with the well. Passive seismic monitoring of controlled increases in fluid pressure at the injection well will allow the spatial and temporal mapping of this field as well as the determination of other associated petrophysical properties as discussed elsewhere in this invention.

While I believe that the foregoing is a reasonable physical model to explain the operation of the invention, I do not wish to be bound by it.

Seismo-Tectonic Reservoir Monitoring System Description

FIG. 4 is a flowchart showing a Seismo-tectonic Reservoir monitoring system. The purpose of this system is to allow the various petrophysical properties associated with seismogenesis to be compared and analyzed. The results of the analysis are output as velocity models, input for reservoir models and the potential for field infrastructure hazard.

Seismo-Tectonic Reservoir Monitoring System Operation

Starting with the left-hand data box of FIG. 4, [10]; geometric and kinematic structural data is assembled along with independently determined velocity models (e.g. from reflection seismology; Velocity model 1). The structural data is then processed (FIG. 4, [11]) to produce one or more valid structural models (FIG. 4, [12]). These models are then compared and rationalized (FIG. 4, [13]) with all velocity models available (e.g. Velocity models 1 and 2) to create a concordant velocity model (Velocity model 3). The structural model that emerges (FIG. 4, [15]) from the comparison is used to define the Finite Deformation Field. The addition of earthquake slip plane data (FIG. 4, [31]) to the Finite Deformation Field, generates the Active Deformation Field (FIG. 4,[17]) that used to identify potential Field Infrastructure Hazards (FIG. 4, [19]).

The Passive Seisimic Network; Eq Signal Data (FIG. 4, [20]) represents the earthquake data collected by the Passive Seismic Network. This data is then prepared for Seismic Tomography and resolution of the hypocentral data by filtering and location of the hypocenters (FIG. 4, [21]). The application of seismic tomography to the data generates Velocity Model 2 used to generate the concordant Velocity model (Model 3) by resolving differences between the independently derived Structural (FIG. 4, [11]) and Velocity models.

Once the concordant velocity model is available, it is used to for both reflection seismic (FIG. 4, [34]) and earthquake data processing (FIG. 4, [24]). The reflection seismic data is acquired through a 4D Active Seismic Array (FIG. 4,[33]). The processed reflection data is used to create a 4D seismic model to image fluid front migration. Earthquake data processing either 1] locates the earthquake hypocenters (FIG. 4, [27]); or 2] where data permits, resolves the hypocenter data (FIG. 4, [26]) to generate earthquake slip planes (FIG. 4, [29]) and stress information (FIG. 4, [28]). The permeability field (FIG. 4,[38]) may be defined using either resolved or unresolved hypocenter data. It is identified by its spatial and temporal location relative to the injection well and the maximum compressive stress of the ambient stress field. If unresolved data is used, it is subject to only Time/space sorting (FIG. 4, [32]). If Resolved data (FIG. 4, [26]) is used, then it is input for further processing by a filtering and sorting application (FIG. 4, [30]) that generates structural assemblages of earthquake slip planes (FIG. 4, [31]). In addition to creating structural assemblages, processing of the earthquake data (FIG. 4, [30]) also includes assigning temporal and magnitude data to each earthquake slip plane.

The processed earthquake slip plane data is used as input to the Active Deformation Field analysis (FIG. 4, [16]) and is incorporated into the Permeability Field Analysis (FIG. 4, [37]) along with the stress data (FIG. 4, [27], [36]) to generate the Permeability Field model (FIG. 4, [38]). This data combined with information from the Active Deformation Field and reservoir Field Operations provides input for Reservoir Modeling (FIG. 4, [39]). Output from the Reservoir Modeling application (Reservoir Model; FIG. 4, [40]), provides data on Infill and Injection Plans (FIG. 4, [41]) that are used to guide Field Operations (FIG. 4, [42]).

Role of STRM in Development and Production Operation

A STRM system has utility throughout the development and production history of a fluid reservoir. The outline of this utility is shown in FIG. 5. The following discussion describes an idealized sequence. The STRM system can be implemented at any stage in the field history.

Pre-Production Phase

I] Pre-Development

A regional passive seismic network is established which includes the site of the proposed field. The network should cover a region whose dip direction dimensions are at least two wavelengths greater than that of the largest structure which forms the field. This network purpose is to; 1] establish the background microseismicity; 2] if background seismicity is sufficient it can be used for seismo-tectonic imaging (Geiser, P. A. and Seeber, L.; 1997 Seismo-Tectonic Imaging: A New Time Lapse Reservoir Monitoring Technique. Applications of Emerging Technologies: Unconventional Methods in Exploration for Petroleum and Natural Gas V. Proceedings, Dallas, Tex.; Oct. 30–31, 1997, ISEM, Southern Methodist University, Dallas, Tex., p. 137–152.) and to build an independent velocity model. This model can be rationalized with other independently determined velocity models to form a concordant velocity model (FIG. 4, [14]) for any initial seismic surveys.

II] Field Delineation and Development

The local seismic network is set up over the area proposed for initial development. The parameters that control the spatial distribution and location of the seismometers include;

1. the minimum size of event to be recorded;
2. The nature of the velocity field of the reservoir.
3. The sensitivity of the geophones;
4. nature of the seismic signal filtering algorithms.

As wells are completed fluid injection tests are run on each well in order to establish the initial permeability field associated with each well (FIGS. 6a–f) and delineate the field. A schematic example of this process is shown in FIGS. 6a–f. The initial STRM mapping is done with the discovery well (FIG. 6a). The permeability distribution revealed by the injection test and STRM mapping is used to locate the next delineation well. An injection test is then done in this well and the permeability field associated with it is revealed and used to plan the location of the next delineation well (FIG. 6b). This procedure is repeated until the entire reservoir permeability field has been mapped (FIGS. 5c,d,e,f and the wells located according to the STRM mapping.

Production Phase

I] Primary Production

Local network monitors field evolution through periodic injection tests, with 4D seismic to recording the fluid migration history. The regional network is used to monitor any far-field effects that may be produced by production operations.

II] Secondary and Tertiary Recovery

Local network to monitor field evolution through periodic injection tests and use of 4D seismic to record fluid migration history. Regional network continues to monitor any far-field effects that may be produced by production operations.

CONCLUSIONS, RAMIFICATIONS, AND SCOPE

Accordingly, it can be seen that with the invention described, I have provided a means of direct 4 dimensional measurement and multidimensional imaging of many if not all the components of the permeability field of a fluid reservoir. This process is referred to as STRM mapping. Use of the information provided by STRM mapping can lead to improved efficiency of well placement and field development. In addition the invention forms a powerful synergistic companion to 4D reflection seismic which can monitor the migration history of the fluid phases as predicted by the permeability field given by the STRM system. Further the two systems can potentially be piggy-backed on each other, while holes dedicated to seismometers can be used for supplying additional information (e.g. cross hole tomography, one way travel time for 3D reflection seismology) thus resulting in efficiencies of operation. Finally the STRM system provides warning on potential damage to infrastructure and to the reservoir itself arising from the active deformation field.

Although the description above contains many specifities, these should not be construed as limiting the scope of the invention but as merely providing illustrations of some of the presently preferred embodiments of this invention. Various other embodiments and ramifications are possible within it's scope. For example, because the STRM system is essentially an experiment in seismogenesis in which not only is the seismogenic object made visible but it allows the process to be studied in the context of a set of controlled conditions where most of the petrophysical parameters are known. Such information is invaluable for gaining deeper understanding of the seismogenic process. The STRM system is also capable of imaging in terrane that is opaque to reflection seismology and thus has utility in regions where reflection data cannot be acquired. Another example of the scope of the invention is that as a passive system it allows imaging in regions that do not permit active systems to operate e.g. regions that are either environmentally or politically sensitive. Thus the scope of the invention should be determined by the appended claims and their legal equivalents, rather than by the examples given.

I claim:

1. A method for measuring and enhancing the ambient permeability fields of a fluid reservoir without appreciably altering the ambient permeability field, comprising the steps of:
    establishing a network of earthquake recording devices for acquiring, resolving, analyzing and monitoring earthquake waves, said network being of a predetermined size and location in and around said reservoir;
    causing a fluid pressure wave to be generated by operation of at least one fluid injection site in said reservoir, said fluid pressure wave causing failure to occur on ambient fractures that form an ambient permeability field associated with said at least one injection site, with said failure enhancing permeability on said ambient fractures, and with said failure generating earthquake seismic waves acquired by said network;
    using said network to image at least one conidial volume of ambient fractures generating said earthquake seismic waves for said at least one injection site, with said at least one conidial volume having an acute apical angle and a cone axis that passes through said at least one injection site, said conidial volume showing a temporal migration of earthquakes away from said at least one injection site, said cone axis being a maximum compressive stress direction of an ambient stress field in the vicinity of said at least one injection site; and
    using said at least one conidial volume and said showing of said temporal migration of said earthquakes away from said at least one injection site to identify said ambient fractures as those that comprise said ambient permeability field to which said at least one injection site is connected;
    whereby said ambient permeability field of a said fluid reservoir is both measured and enhanced in time and space.

2. The method of claim 1 including the step of preparing a set of multidimensional images of said ambient permeability field in which each image within said set is temporally separated from a preceding image within said set, thereby showing changes of said ambient permeability field with time.

3. The method of claim 2 wherein said set of images is stored in a memory or contained on maps or electronic or printed display media.

4. A method for determining a plurality of maximum compressive stress directions of an ambient stress field within a fluid reservoir field comprising the steps of:
    establishing a network of earthquake recording devices for acquiring, resolving, analyzing and monitoring earthquake waves, said network being of a predetermined size and location in and around said reservoir field;
    causing a fluid pressure wave to be generated by operation of at least one fluid injection site within said reservoir field, said fluid pressure wave causing failure to occur on ambient fractures that comprise an ambient permeability field associated with said at least one injection site, with said failure enhancing permeability on said ambient fractures, and with said failure generating earthquake seismic waves being acquired by said network;
    using said network to image at least one conidial volume of ambient fractures generating said earthquake seismic waves for said at least one injection site, with said at least one conidial volume having an acute apical angle and a cone axis that passes through said at least one injection site, said conidial volume showing a temporal migration of earthquakes away from said at least one injection site;
    plotting an orientation of said cone axis in space, said cone axis being a maximum compressive stress direction of an ambient stress field in the vicinity of said at least one injection site; and
    repeating said establishing step, said causing step, said using step and said plotting at additional injection sites said reservoir field;
    whereby a plurality of maximum compressive stress directions are determined for said reservoir field.

5. The method of claim 4 including the step of preparing a set of multidimensional images of said plurality of maximum compressive stress directions.

6. The method of claim 5 wherein said set of images is stored in a memory or contained on maps or electronic or printed display media.

7. A method for the multidimensional imaging of an ambient permeability field that is within a fluid reservoir having at least one well therein, comprising the steps of:
    establishing a network of earthquake recording devices for acquiring, resolving, analyzing and monitoring earthquake data, said network being of a predetermined size and location in and around said fluid reservoir;
    causing a fluid pressure wave to be generated by operation of a fluid injection site within said fluid reservoir, said fluid pressure wave causing failure to occur on ambient fractures within an ambient permeability field that is associated with at least one injection site, with said failure enhancing permeability on said ambient fractures, and with earthquake data generated by said failure being acquired by said network;
    using said network to image at least one conoidal volume of ambient fractures generating said earthquake data for said at least one injection site, with said at least one conidial volume having an acute apical angle and a cone axis that passes through said at least one injection site, said conidial volume showing a temporal migration of earthquakes away from said at least one injection site;

using said at least one conidial volume and said showing of a temporal migration of said earthquakes away from said at least one injection site to identify said ambient fractures as those that comprise an ambient permeability field to which said at least one injection site is connected; and plotting data acquired by said network in n-dimensional space to locate wells within said reservoir that are hydraulically linked to said at least one injection site.

8. The method of claim 7 including the steps of:

repeating said establishing step, said causing step and said two using steps to show a temporal migration of earthquakes away from additional injection sites; and plotting data acquired by said network in n-dimensional space to locate additional wells that are hydraulically linked to said additional injection sites.

9. The method of claim 8 including the steps of;

providing a set of multidimensional images showing spatial and temporal locations of said ambient fractures and associated permeability values of said ambient permeability field wherein each multidimensional image within said set of images is temporally separated from a preceding image in said set of images.

10. The method of claim 9 wherein said set of multidimensional images is digitally stored in a memory or contained on maps or electronic or printed display media.

11. A method of claim 9 including the steps of:

superimposing said set of multidimensional images on a multidimensional image of a volume of the earth's crust, said volume containing said fluid reservoir; and using a spatial and temporal distribution of said fractures and said associated permeability values to indicate an organization of injection, infill and delineation wells relative to a distribution of said fractures and their associated permeability values.

12. The method of claim 11 including the step of:

drilling at least one well at a location that is indicated by said using step of claim 11.

13. The method of claim 9, including the steps of:

defining a finite deformation field within said fluid reservoir;

combining said data acquired by said network with said finite deformation field, to thereby form combined data; and sorting said combined data according to a relationship to said finite deformation field;

whereby active structural components of said finite deformation field are determined in time and space.

* * * * *